(12) United States Patent
Adam et al.

(10) Patent No.: US 6,641,092 B1
(45) Date of Patent: Nov. 4, 2003

(54) SUPPORT FOR DEVICES, IN PARTICULAR FOR ELECTRICAL DEVICES, TO BE ATTACHED TO THE BASE SECTION OF TRUNKING

(75) Inventors: Damien Adam, Saint Symphorien (FR); Bertrand Decore, La Chapelle Saint Aubin (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 0 days.

(21) Appl. No.: 09/688,346

(22) Filed: Oct. 16, 2000

(30) Foreign Application Priority Data

Oct. 15, 1999 (FR) .............................. 99 12920

(51) Int. Cl.[7] .............................................. G12B 9/00
(52) U.S. Cl. ..................... 248/27.1; 248/205.1; 174/49; 174/101
(58) Field of Search .................... 248/205.1, 27.1, 248/27.3, 544, 558, 906; 174/48, 49, 94, 96, 97, 98, 99 R, 101; 52/220.1, 220.3, 220.5, 220.7; 403/3, 4, 291; H02G 3/04

(56) References Cited

U.S. PATENT DOCUMENTS

| 3,918,920 A | * | 11/1975 | Barber ....................... 206/306 |
| 5,086,194 A | * | 2/1992 | Bruinsma .................... 174/48 |
| 5,379,972 A | * | 1/1995 | Decore et al. ............. 248/27.1 |
| 5,569,884 A | * | 10/1996 | Decore ....................... 138/155 |
| 5,614,695 A | * | 3/1997 | Benito Navazo ............ 174/48 |
| 5,957,414 A | * | 9/1999 | Perrignon de Troyes et al. 174/101 |
| 5,981,872 A | * | 11/1999 | Decore et al. ............... 174/101 |
| 6,299,476 B1 | * | 10/2001 | Schramme et al. ......... 439/492 |
| 6,335,484 B1 | * | 1/2002 | Jarry et al. ................... 174/48 |
| 2002/0125028 A1 | * | 9/2002 | Jadaud et al. ................. 174/48 |

FOREIGN PATENT DOCUMENTS

| EP | 0054456 A1 | * | 11/1981 |
| EP | 0289410 A1 | * | 4/1988 |
| EP | 0702443 A1 | * | 3/1996 |
| EP | 0851551 A1 | * | 7/1998 |
| EP | 0921617 A1 | * | 6/1999 |
| EP | 1091464 A1 | * | 4/2001 |
| FR | 2614752 A1 | * | 4/1987 |
| FR | 2 741 755 | | 5/1997 |
| FR | 2 776 134 | | 9/1999 |
| GB | 2254966 A | * | 10/1992 |
| JP | 0830806 A2 | * | 11/1996 |

* cited by examiner

Primary Examiner—Kimberly Wood
Assistant Examiner—Naschica S. Morrison
(74) Attorney, Agent, or Firm—Young & Thompson

(57) ABSTRACT

A support for a device, in particular for an electrical device, to be attached to a base section of trunking with rims directed towards each other has two crossmembers which interengage with the rims and each of which is equipped with arrangements for fixing the device. The fixing arrangements are attached to each crossmember by a flexible connection catering for a slightly offset position of the fixing arrangements in the general direction of the crossmember relative to a stable original position when fixing the device to the support.

20 Claims, 3 Drawing Sheets

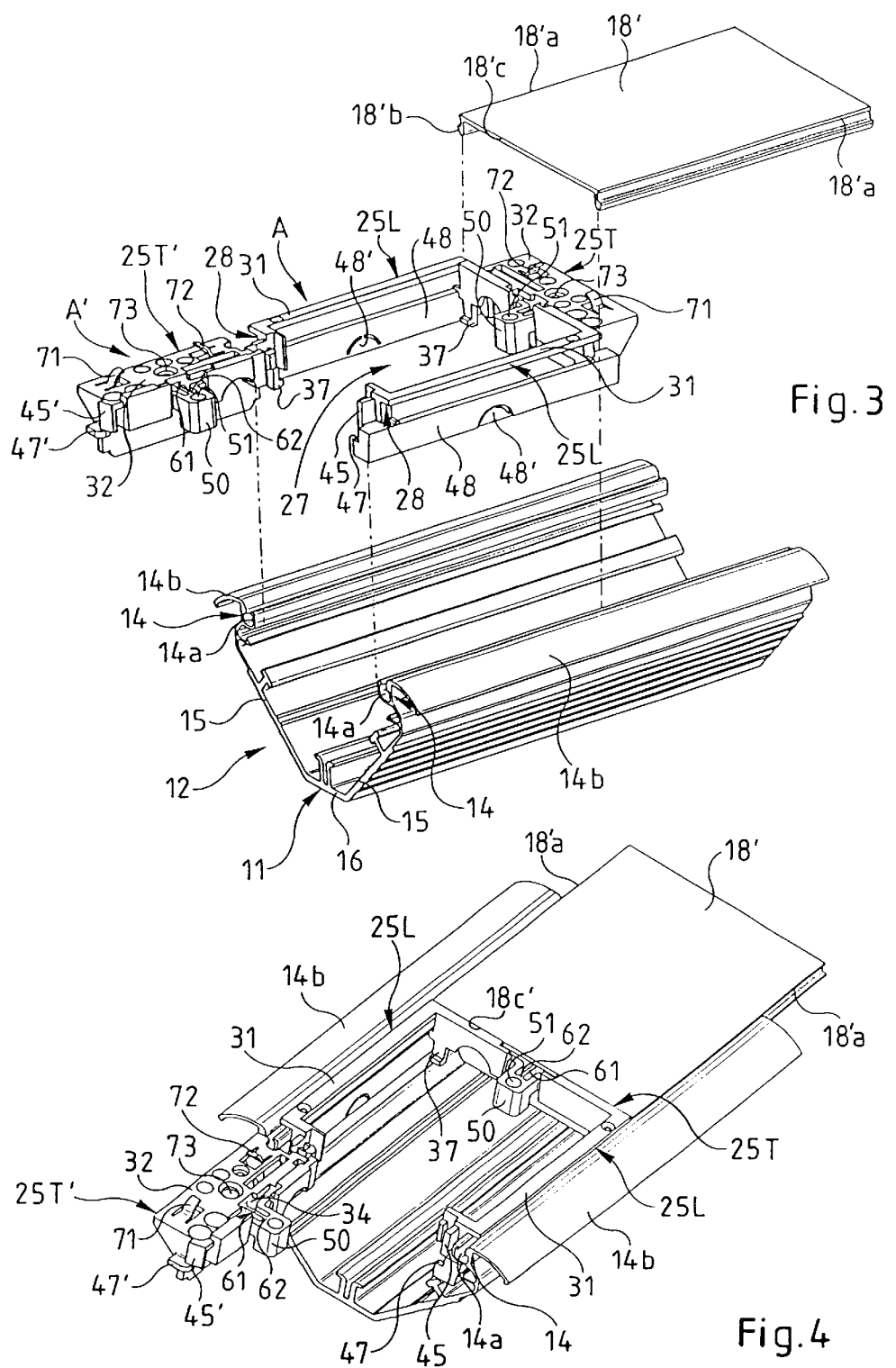

SUPPORT FOR DEVICES, IN PARTICULAR FOR ELECTRICAL DEVICES, TO BE ATTACHED TO THE BASE SECTION OF TRUNKING

FIELD OF THE INVENTION

The present invention relates generally to support systems used to attach devices across a base section of trunking, from one of two longitudinal walls of the trunking to the other, whether those walls are lateral flanges of the trunking base section or internal partition walls that the trunking may include to subdivide its interior volume into two or more compartments. The invention relates more particularly to the situation in which the devices are electrical devices, for example socket outlets.

The present invention relates in particular to a support for a device to be attached to the base section of trunking, which base section has rims facing towards each other, where the support is of the type including two crossmembers which are adapted to be interengaged with said rims by interengagement means and each of which is equipped with means for fixing said device.

By separating the crossmembers from each other, it is advantageously possible to match the assembly to any distance between fixing centers parallel to the length of the trunking base section, and therefore parallel to the length of the cover section.

DESCRIPTION OF THE PRIOR ART

In some systems known in the art it is also possible, at least to some degree, to match the length of the crossmembers to the distance in the widthwise direction between the two longitudinal walls concerned of the trunking base section, and therefore the width of the cover section.

To this end, in the aforementioned systems known in the art, each crossmember has a central part and one or more portions at its ends adapted to be cut off, and the end parts include interengagement means for interengaging the assembly as a whole with the longitudinal walls concerned of the trunking base section to be equipped, and are attached to the ends of the central part, nesting fashion, in the manner of terminations.

To adapt a crossmember to the required width, all that is required is therefore to eliminate one or more of the portions of the central part of the crossmember which are adapted to be cut off.

This has various disadvantages, however, which relate essentially to the fact that there is inevitably a dependent relationship between, on the one hand, adapting each crossmember to the width of the cover section and, on the other hand, the final position of the fixing means equipping each crossmember which, when the length of each crossmember is modified, can end up off-center relative to a position initially provided on the longitudinal axis of symmetry of said trunking.

In some cases, for a given crossmember length, it is also necessary to modify the position of the fixing means equipping a crossmember to allow an off-center position of the device to be fixed, for example if the device is fastened to an embellisher plate relative to which it is off-center, or for example in the situation where the device has a large overall volume at the rear such that when it is mounted on said support in the trunking it bears against an inside part of the trunking, as a result of which the fixing means are off-center relative to a position initially provided on the longitudinal axis of symmetry of said trunking.

U.S. Pat. No. 5,957,414 discloses a support for a device to be attached to the base section of trunking which has rims facing towards each other, which support has two crossmembers adapted to interengage with said rims and each of which is equipped with means for fixing said device whose position along the crossmember can be adjusted by means of a complex system of co-operating detents.

Although a system of the above kind is entirely satisfactory when it is a question of continuous or substantially continuous adjustment of the position of the fixing means equipping the crossmembers over a relatively large portion of the length of the crossmembers, it adds to the cost and complexity of manufacture and use of the device support, which cannot be justified if the range of adjustment of said fixing means is particularly small, in order to allow a slightly off-center position of said fixing means relative to an intended original position.

Accordingly, compared to the aforementioned prior art, the present invention proposes a new disposition of the crossmembers of a device support provided with fixing means whose position can be adjusted to match those of device fixing means which are slightly off-center relative to an intended original position along said crossmembers, and which is simple to manufacture at low cost.

SUMMARY OF THE INVENTION

The invention relates more particularly to a device support of the type defined in the introduction in which the fixing means are attached to each crossmember by a flexible connection catering for a slightly offset position of the fixing means in the general direction of the crossmember relative to a stable original position when fixing the device to the support.

In accordance with the invention, the flexible connection attaching the fixing means to each crossmember advantageously cater for a slightly off-center position of the fixing means, enabling a support of given length, mounted on the trunking, to receive different devices, for example devices constituting a series, whose overall sizes are different, mounting of which can entail slightly offsetting their fixing means relative to an intended original position.

Other non-limiting and advantageous features of the device support according to the invention are stated hereinafter.

The offset position of the fixing means is achieved by pivoting the flexible connection in the plane of said crossmember.

The fixing means equipping a crossmember are part of a stud fastened to the flexible connection, which stud can carry abutments on respective opposite sides of said flexible connection adapted to bear against a portion of each crossmember to limit the travel of said fixing means.

Each stud is formed in one piece with the associated flexible connection, and each flexible connection consists of a flexible tongue perpendicular to the general direction of a crossmember, which flexible tongue can be molded in one piece with each crossmember from a plastics material.

The support has four sides in the general form of a frame, two of which are longitudinal sides having on their outside edge groove means adapted for interengaging them with the rims of the base section of the trunking to be equipped and two transverse sides formed by said crossmembers, said sides defining internally a central opening for fitting at least one device and being divided into at least two parts hinged together by a hinge, forming a single part so that they can be at least locally discontinuous to provide lateral access to the central opening.

In one embodiment of the invention, the longitudinal sides include longitudinal members provided with at least one portion which can be cut off to form an orifice for electrical power supply cables of a device to pass through.

The following description, which is given with reference to the accompanying drawings, which are provided by way of non-limiting example, explains in what the invention consists and how it can be put into effect.

BRIEF DESCRIPTION OF THE DRAWINGS

FIG. 3 is an exploded perspective view of the support according to the invention shown in FIGS. 1 and 2 and adapted to be attached to trunking adapted to be closed by a second type of closure cover section.

FIG. 4 is a plan view of the support from FIG. 3 mounted in the trunking, which is closed by the closure cover section.

DETAILED DESCRIPTION OF THE PREFERRED EMBODIMENTS

Figure 1:
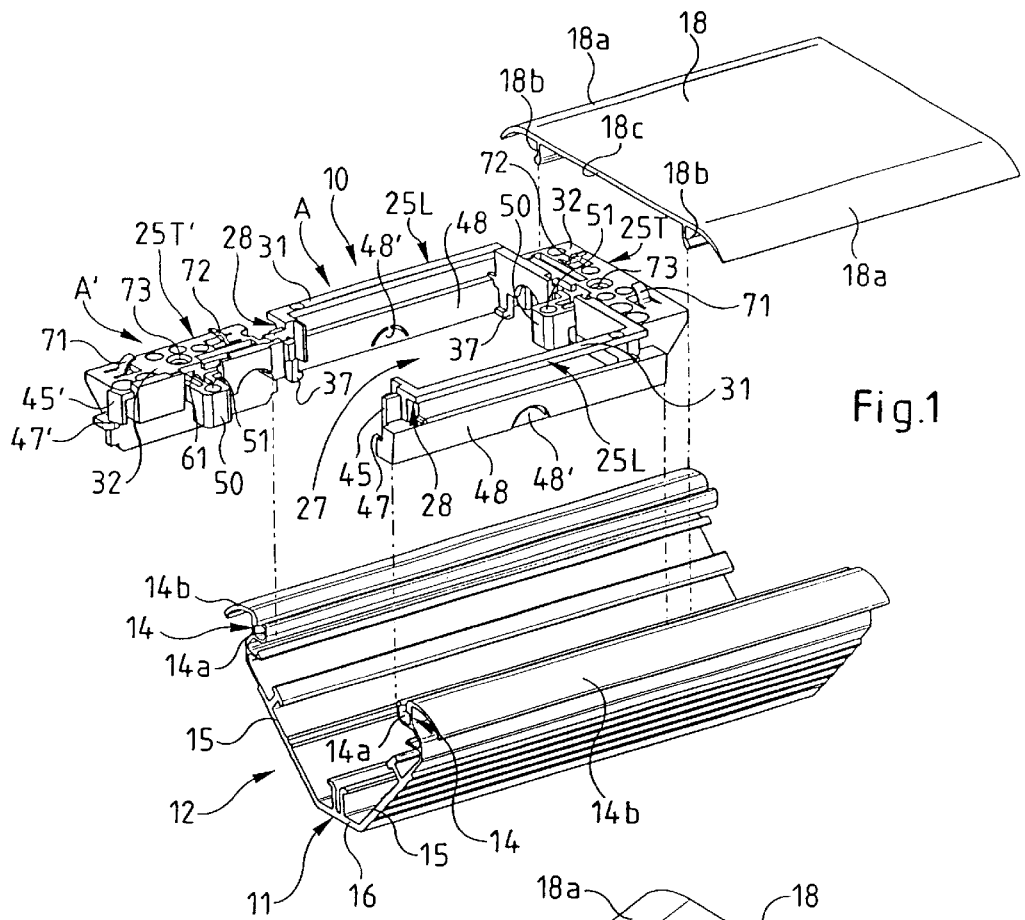
FIG. 1 is an exploded perspective view of a preferred embodiment of a support according to the invention adapted to be attached to a base section of trunking adapted to be closed by a first type of closure cover section.

FIGS. 1 to 4 show a devices support 10 according to the invention adapted to enable a device of any kind (not shown) to be attached from the front to a base section 11 of trunking 12.

The trunking 12 is well known in the art and is not described in detail.

It includes a base section 11 which has two facing rims 14 along respective free edges of lateral flanges 15.

The rims 14 each have a curved edge 14b drooping towards the outside of the trunking. The curved sides 14b give said trunking a particular visual appeal.

The device support 10 is attached to the base section 11 by means of the rims 14 of the trunking.

In the embodiment shown, the base section 11 has a V-shaped profile in cross section with a bottom 16, from which its lateral flanges 15 extend along diverging axes, and its rims 14 are parallel to the bottom 16.

In a different embodiment, not shown, the base section could have a U-shaped profile in cross section with a bottom perpendicular to its flanges and rims parallel to the bottom.

The trunking 12 is complemented by a cover section for closing its base section 11.

Figure 2:
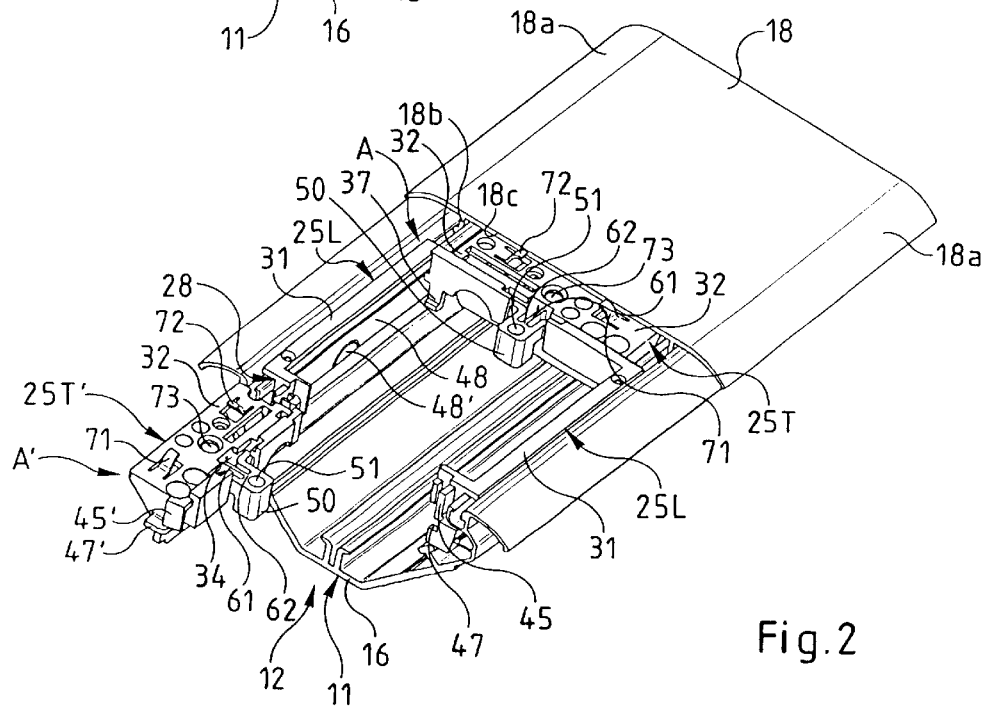
FIG. 2 is a plan view of the support shown in FIG. 1 positioned in the base section of the trunking, which is closed by a closure cover section.

In the embodiment shown in FIGS. 1 and 2, the cover section 18 has longitudinal edges 18a which are slightly curved, so that they droop towards the outside of the trunking, and are intended to cover the curved outside edges 14b of the rims 14 of said trunking.

As can be seen in FIG. 4 in particular, when the cover section 18' is mounted on the trunking 12, it leaves uncovered the curved edges 14b of the rims 14 of said trunking.

To enable each closure cover section 18, 18' to be clipped onto the trunking, each rim 14 of said trunking has a channel 14a running along its free edge and each cover section 18, 18' includes two parallel clips 18b, 18'b near its longitudinal edges 18a, 18'a adapted to deform elastically to engage in respective channels 14a.

The device support 10 according to the invention is locally substituted for the closure cover section. This is known in the art.

The device to be mounted in the support 10 is not shown. It can be a multiple socket outlet, for example.

In the examples shown in the figures, the device support 10 according to the invention has four sides 25L, 25T, 25T' in the general form of a frame inside which they define a central opening 27 into which at least one device can be fitted (a single device in this example), and two opposite sides 25L of which, which in this example are the two longitudinal sides, each have on their outside edge groove means 28 adapted to interengage with the rims 14 of the base section 11 of the trunking 12 to be equipped, to be more precise the channel-shaped portions 14a of the rims 14.

The sides 25L, 25T, 25T' of the support 10 are divided into at least two parts A, A' which can be at least locally discontinuous to provide lateral access to the opening 27.

The parts A, A' are in one piece and in this example they are hinged together by means of a hinge 30.

Because of the hinge 30, the device support 10 can be changed from an open configuration, shown in FIGS. 1 to 4 in particular, to a closed configuration, not shown. Its open configuration advantageously provides lateral access to the central opening 27.

In the embodiment shown, one of the parts A includes the two longitudinal sides 25L and a transverse side consisting of a crossmember 25T, and the other part A' includes only one transverse side, consisting of a crossmember 25T'.

The device support 10 is open in the direction of the length of the base section 11 of the trunking 12.

Its part A, which is formed by a fixed crossmember 25T and the two longitudinal sides 25L including the groove means 28, has a U-shaped contour when seen in plan view.

Its part A', which is formed of a single mobile transverse side 25T', is therefore reduced to a crossmember adapted to close the part A.

Each longitudinal side 25L has a projecting band running along all of its length, so that it is level with the rims 14 of the base section of the trunking 12, and a longitudinal member 48 adapted to be positioned inside the trunking opposite a longitudinal rib which contributes to stiffening the trunking and lies just under the channel 14a of a rim 14.

Each crossmember 25T, 25T' forms a rectangular surface tongue 32 throughout its length, which tongue is set back relative to the band 31 of the longitudinal side 25L and is adapted to be inserted under corresponding portions of a closure cover section or a joint-cover (not shown) joining an embellisher covering a device and a closure cover section, as described below.

Each tongue 32 of the crossmembers 25T, 25T' extends transversely, cantilever-fashion.

Hooks 37 at the four corners of the bottom surface of the support 10 enable an insulative casing of a device, not shown, to be attached to it if required.

Figure 5:
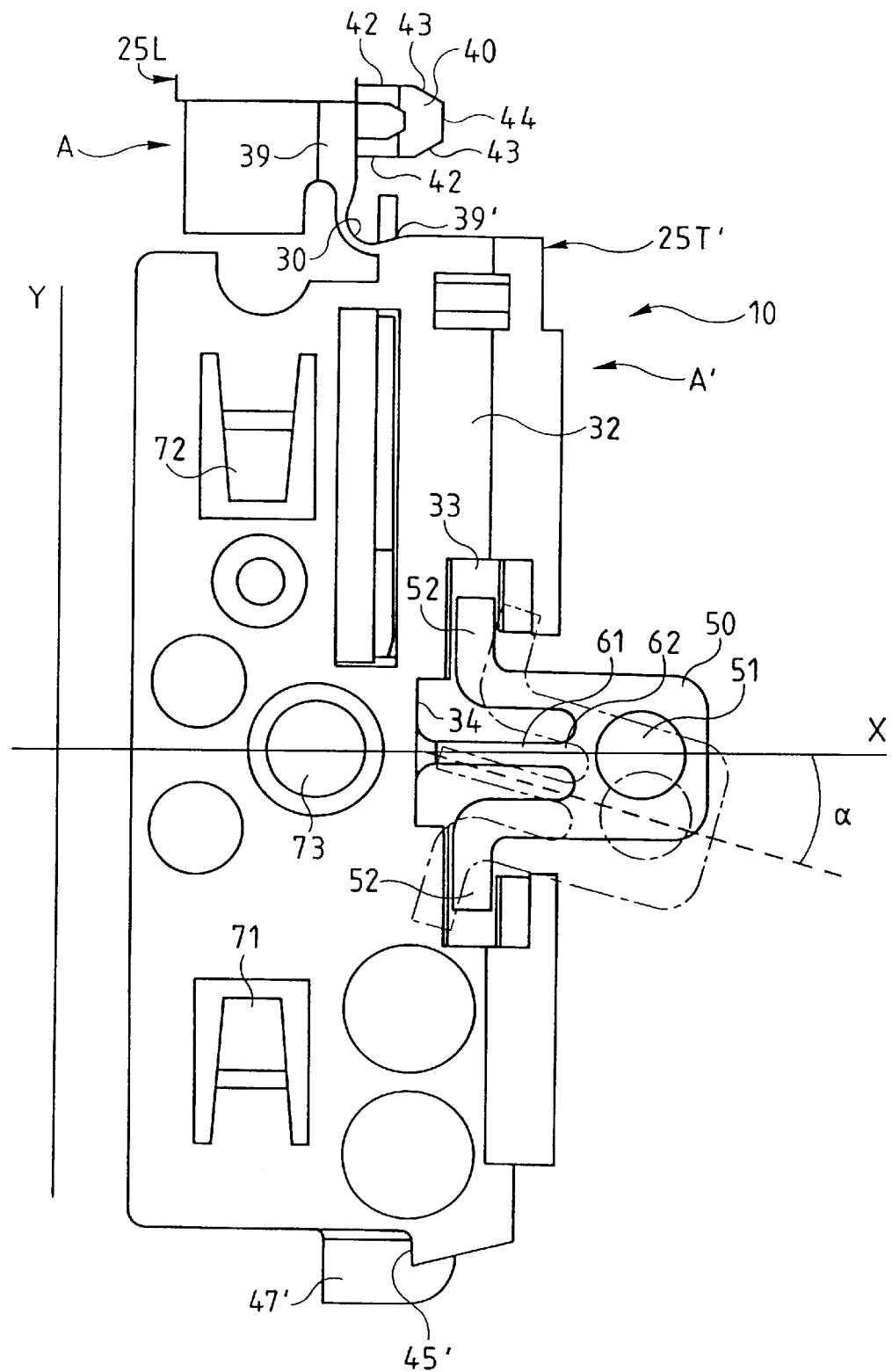
FIG. 5 is a diagrammatic plan view showing a detail of one crossmember of the support shown in FIGS. 1 to 4.

As shown in FIG. 5, in particular, in this example of a device support according to the invention, the hinge 30 is operative between a lateral side 39' of the crossmember 25T' and a second tongue 39 which locally extends the longitudinal side 25L to which the crossmember 25T' is hinged, at the end of that longitudinal side 25L.

The tongue 39 is preferably rigid or semi-rigid.

Centering means are preferably provided between the two parts A, A' in the vicinity of the hinge 30.

As shown in FIG. 5, for example, the centering means include a boss 40 which projects from the part A and a housing, not shown, which is at least partly complementary to the boss 40 and recessed into the part A'.

The boss 40 which forms a portion of the part A projects from the inside surface of the tongue 39 extending the longitudinal side 25L on the same side as the hinge 30.

The boss 40 has two back-to-back centering facets 42 parallel to the axis of the hinge 30 and perpendicular to the tongue 39 which carries it. The corresponding housing on the part A' advantageously has two centering facets of its own.

The boss 40 has upstream of its centering facets 42 two oblique engagement facets 43 which facilitate its interengagement in the corresponding housing and have an acute angle between them, forming a dihedron.

As shown, on the same side as this dihedron, the boss 40 can also be flattened by a chamfer 44 on one or both faces parallel to the general plane of the device support 10.

The hinge 30 is a localized thinner flexible tongue. It extends substantially one quarter-circle.

As is the case in the embodiment shown, clipping means 45, 45' are preferably provided between the two parts A, A' and at a distance from the hinge 30.

The clipping means 45, 45' are operative between the end of the articulated crossmember 25T' opposite the hinge 30 and the free end of the corresponding longitudinal side 25L.

To be more precise, the end concerned of the crossmember 25T' carries a detent 45' which projects from the lateral edge of the crossmember, and there is a complementary detent 45 at the free end of the corresponding longitudinal side 25L.

Means are also advantageously provided for guiding the articulated crossmember 25T' when it is clipped to the corresponding longitudinal side 25L.

The guide means are operative between said ends of said crossmember and the corresponding longitudinal side.

They include a rounded ramp 47' formed on said crossmember 25T' just below the clip 45' and a groove 47 formed at the corresponding free end of said longitudinal side 25L and adapted to receive said ramp 47' to clip said clipping means.

As shown in FIGS. 1 to 4 in particular, the longitudinal members 48 of the longitudinal sides 25L of the support 10 each include a portion 48' which can be cut off and is in the form of a portion of a disk which is thinner than the longitudinal members and is attached to each longitudinal member by a stud of the same thickness. Each portion adapted to be cut off forms an opening for electrical power supply cables of a device inserted into said central opening 27.

Each crossmember of the support 10 shown is advantageously equipped with means 51 for fixing said device.

The fixing means 51 are attached to each crossmember 25T, 25T' by a flexible connection catering for a slight offset of said fixing means in the general direction Y of the crossmember relative to a stable original position (shown in thicker outline in FIG. 5) when fixing said devices to said support.

To be more precise, as shown in FIG. 5, said offsetting of the fixing means is achieved by pivoting the flexible connection 61 in the plane X, Y of said crossmember 25T' (the offset position is shown in dashed outline in FIG. 5).

Here the flexible connection consists of a flexible tongue 61 perpendicular to the general direction Y of the crossmember 25T'. It is molded from plastics material in one piece with each crossmember.

Each flexible tongue 61 is positioned in a recess 34 formed in each crossmember 25T, 25T' so that it does not project from the outside longitudinal edge of said crossmember.

The fixing means 51 equipping a crossmember 25T' also form part of a stud 50 attached to said flexible connection 61.

Here, each stud 50 is advantageously formed in one piece with the associated flexible tongue 61 constituting said flexible connection, and is located at one end 62 of the tongue 61, projecting from the crossmember towards the inside of the support 10.

Each stud 50 carries abutments 52 on respective opposite sides of said flexible connection 61 which extend in the general direction Y into a housing 33 provided in the crossmember 25T'.

The abutments 52 are adapted to bear against a part of each crossmember 25T' to limit the travel of said fixing means.

The angular movement a of the stud 50 is fixed to cater for offsetting the fixing means 51 in the general direction Y of the crossmember by an amount of the order of ±3 mm, for example.

The abutments 52 for limiting the travel of the fixing means protect each flexible tongue 61 so that they are always deformed elastically.

The fixing means 51 equipping each crossmember 25T, 25T' advantageously include a threaded insert (not shown) force-fitted into a housing provided in said stud 50.

Accordingly, when a device whose half-mechanism width is a few millimeters greater than half the width of the available opening 27 in the support is engaged in said support, it comes on the half-mechanism side into bearing engagement against a longitudinal member of the support or against a channel of the base section of the trunking, which imparts a slightly off-center position to its fixing means.

To fix it to the support, it is then sufficient to impart an off-center position to the fixing means 51 equipping the crossmember 25T, 25T' by flexing the flexible tongues 61 to make said fixing means of the support 10 coincide with those of the device.

The fixing means connected to the crossmembers of the support 10 therefore remain in position because the device (not shown) bears against the support or against the trunking.

If the device in question is demounted, the fixing means of the crossmembers of the support revert to their stable original position along the X axis (shown in FIG. 5) by virtue of their elasticity.

Each crossmember 25T, 25T' advantageously further includes at least one finger projecting from the outside surface of the crossmember 25T, 25T' to form an abutment for locating the closure cover section 18 of the trunking 12 shown in FIGS. 1 and 2.

Here, each crossmember 25T, 25T' is provided with two fingers 71, 72 symmetrically positioned relative to the transverse median axis X of said crossmember.

In the embodiment shown in FIGS. 1 and 2, the cover section 18 including longitudinal edges 18a covering the curved longitudinal edges of the trunking must be positioned with its cut transverse edge 18c at a certain distance from the support 10 adapted to receive the device.

That distance is fixed by the fingers 71, 72 provided on each crossmember, the width of which is determined to enable a joint-cover to be clipped to the crossmember, the joint-cover (not shown) covering the part of each crossmember carrying said finger and forming the junction between an embellisher (not shown) fitted over the device placed in the support 10 and the closure cover section 18 of the trunking.

Each of the fingers 71, 72 on each crossmember is preferably retractable within said crossmember to enable the positioning of a closure cover section 18' as shown in FIGS. 3 and 4, which covers the whole of a crossmember with its cut transverse edge 18'c positioned adjacent the fixing means of the device equipping said crossmember.

Each finger consists of an elastic tongue which is molded in one piece with each crossmember.

Finally, each crossmember includes a central orifice 73 for mounting a joint-cover forming the junction between an embellisher and a closure cover section.

The present invention is in no way limited to the embodiment described and shown, to which the skilled person will know how to apply any variant within the spirit of the invention.

In particular, the device support according to the invention could include only two crossmembers adapted to interengage with one or the other of the longitudinal walls concerned of the base section of the trunking.

The crossmembers can then be separated from each other to adapt the assembly to any distance between fixing centers parallel to the length of the base section of the trunking and therefore parallel to the length of the cover section.

In this case, in the context of the invention, the crossmembers forming device supports can advantageously have ends consisting of one or more portions which can be cut off to adapt to different widths of trunking.

Also, according to another variant of the invention, a single positioning abutment finger can be provided on each crossmember, which is not retractable and merely enables a cover section to be positioned relative to an embellisher for covering a device placed in the support.

The crossmember carrying its non-retractable abutment could then be covered by a joint-cover having a housing on the inside to receive said finger projecting from the outside surface of each crossmember.

What is claimed is:

1. A support for an electrical device, to be attached to a base section of trunking with rims directed towards each other, of the type including: two crossmembers which are adapted to interengage with said rims through the intermediary of interengagement means and each of which is equipped with means for fixing said device, wherein said fixing means are attached to each crossmember by a flexible connection catering for a slightly offset position of said fixing means relative to a stable original position when fixing said device to said support, and wherein said offset position of said fixing means is achieved by pivoting said flexible connection in a plane of said crossmember.

2. The support claimed in claim 1 wherein said fixing means equipping a crossmember are part of a stud fastened to said flexible connection.

3. The support claimed in claim 2 wherein each stud carries abutments on respective opposite sides of said flexible connection adapted to bear against a portion of each crossmember to limit travel of said fixing means.

4. The support claimed in claim 2 wherein each stud is formed in one piece with the associated flexible connection.

5. The support claimed in claim 1 wherein each flexible connection consists of a flexible tongue perpendicular to the general direction of a crossmember.

6. The support claimed in claim 5 wherein each flexible tongue is molded in one piece with each crossmember from a plastics material.

7. The support claimed in claim 1 having four sides in the general form of a frame, two of which are longitudinal sides having on their outside edge groove means adapted for interengaging them with the rims of said base section of said trunking to be equipped and two transverse sides formed by said crossmembers, said longitudinal sides defining internally a central opening for fitting at least one device and being divided into at least two parts hinged together by a hinge, forming a single part so that said parts can be at least locally discontinuous to provide lateral access to said central opening.

8. The support claimed in claim 7 wherein one part as three sides and the other part has one crossmember.

9. The support claimed in claim 7 wherein said hinge is operative between an edge of a crossmember and a tongue which locally extends the longitudinal side to which said crossmember is articulated.

10. The support claimed in claim 7 wherein centering means are provided between said two parts in the vicinity of said hinge.

11. The support claimed in claim 7 wherein clipping means are operative between an end of the articulated crossmember opposite said hinge and a free end of the corresponding longitudinal side.

12. The support claimed in claim 11 wherein said clipping means include two detents which co-operate with each other.

13. The support claimed in claim 11 wherein guide means are operative between ends of said crossmember and the corresponding longitudinal side carrying said clipping means for guiding them during clipping.

14. The support claimed in claim 13 wherein said guide means include a rounded ramp formed on said crossmember and a groove formed at the end of the corresponding longitudinal side and adapted to accomodate said ramp to clip said clipping means.

15. The support claimed in claim 7 wherein said longitudinal sides include longitudinal members provided with at least one portion which can be cut off to form an orifice for electrical power supply cables of a device to pass through.

16. The support claimed in claim 1 wherein each crossmember includes at least one finger which projects from an outside surface of said crossmember to form an abutment for locating a closure cover section of said trunking.

17. The support claimed in claim 16 wherein each finger is retractable inside said crossmember.

18. The support claimed in claim 16 wherein each finger comprises an elastic tongue which is formed in one piece with each crossmember.

19. The support claimed in claim 16 wherein each cross ember has two fingers positioned symmetrically relative to the transverse median axis of said crossmember.

20. The support claimed in claim 1 wherein each crossmember includes an orifice for mounting a joint-cover joining an embellisher fitted over said device and a closure cover section of said trunking.

* * * * *